(12) United States Patent
Krause et al.

(10) Patent No.: US 7,336,445 B2
(45) Date of Patent: Feb. 26, 2008

(54) CONDUCTIVE STUD FOR MAGNETIC RECORDING DEVICES AND METHOD OF MAKING THE SAME

(75) Inventors: Rainer Klaus Krause, Kostheim (DE); Jan Marien, Selzen (DE); Johannes Thomas Paul, Mainz (DE); Gunther Wilhelm Sandmann, Mainz (DE); Gerhard Anton Scherb, Mainz (DE); Hubert Erwin Schuy, Oppenheim (DE); Stefan Seifried, Nidderau (DE)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/325,897

(22) Filed: Jan. 4, 2006

(65) Prior Publication Data
US 2006/0114610 A1    Jun. 1, 2006

Related U.S. Application Data

(62) Division of application No. 10/314,067, filed on Dec. 6, 2002, now Pat. No. 7,020,959.

(51) Int. Cl.
G11B 5/48    (2006.01)
(52) U.S. Cl. .................................. 360/245.8
(58) Field of Classification Search ..................... None
See application file for complete search history.

(56) References Cited

U.S. PATENT DOCUMENTS

| 5,226,232 A | 7/1993 | Boyd |
| 5,462,637 A | 10/1995 | Thiele |
| 5,863,448 A | 1/1999 | Otani et al. |
| 6,747,846 B2 * | 6/2004 | Kato et al. ............... 360/234.5 |

FOREIGN PATENT DOCUMENTS

| JP | 3610687 A | 4/1986 |
| JP | 404010534 A | 1/1992 |

* cited by examiner

Primary Examiner—David Davis
(74) Attorney, Agent, or Firm—John J. Oskorep, Esq.; Rambod Nader

(57) ABSTRACT

A magnetic recording device makes use of an "anchored" conductive stud which is securely attached within its surrounding insulator materials. The conductive stud is formed over a conductive layer which is coupled to or part of a read or a write head element of the magnetic recording device. The conductive stud has a top stud portion and a bottom undercut portion formed over the conductive layer. In one illustrated embodiment, the bottom undercut portion has a width that is greater than the width of the top stud portion. Since an insulator is formed around the conductive stud and over its bottom undercut portion, a secure coupling between the conductive stud and the conductive layer is provided. Preferably, the conductive layer is made of copper (Cu), the conductive stud is made of gold (Au), and the insulator is alumina ($Al_2O_3$). A seed layer may be formed between the conductive stud and the conductive layer. A method of making the conductive stud using a photolithography process is also disclosed.

15 Claims, 6 Drawing Sheets

CONDUCTIVE STUD FOR MAGNETIC RECORDING DEVICES AND METHOD OF MAKING THE SAME

CROSS-REFERENCE TO RELATED APPLICATION

This patent application is a divisional of and claims priority to U.S. patent application Ser. No. 10/314,067 and filing date of 6 Dec. 2002 now U.S. Pat. No. 7,020,959.

BACKGROUND OF THE INVENTION

1. Field of the Invention

This invention relates generally to conductive studs formed across several functional layers of magnetic recording devices, and more particularly to conductive studs formed with bottom undercut portions which are anchored within surrounding insulative materials.

2. Description of the Related Art

Thin film magnetic heads are primarily used in magnetic storage systems to write/read information in the form of magnetic pulses to/from a relatively moving magnetic medium. A magnetic transducer, such as an inductive or magnetoresistive head (MR or GMR type), is typically formed on a slider which is then mounted to a suspension arm of an actuator. The suspension arm suspends the head in close proximity to a disk surface.

Head supporting sliders are generally fabricated from a thin wafer of substrate including a matrix of thin film magnetic heads formed on one of the wafer surfaces. A number of known fabrication techniques may be used to form the heads, e.g., sputtering, vapor deposition, photolithography, and plating. The particular processes used will depend on the type of head being constructed, but generally each process includes a stage wherein terminal pads or studs are formed at the slider's trailing edge for providing an electrical contact to the functional head element. For example, the formation of an inductive head can be separated into four stages: the construction of the first magnetic pole; formation of the conductor coil; construction of the second magnetic pole; and formation of the electrical conductors (studs). Four terminal pads or studs are usually required for each head. Upon completion of the studs, wafers are sliced and diced by known methods to form individual sliders. The sliders are then bonded to suspension arms, and leads from the suspension are soldered to the studs. Relatively large conductors are used in thin film heads to provide desired characteristics of mechanical stability, chemical stability and low contact resistivity.

Depending on the shape of the stud, it may have an undesirable tendency to break away from its surrounding materials. To illustrate, FIG. 1 is a cross-sectional view of a conventional interconnection structure 200 of a magnetic recording device. A conductive stud 220 includes a top stud portion 202 made of gold (Au) and a bottom stud portion 206 made of copper (Cu). In the cross-sectional view, top stud portion 202 has a generally rectangular shape and bottom stud portion 206 has a generally trapezoidal shape with its shorter base side formed over conductive layer 204 (on top of seed layer 208). Bottom stud portion 206 is formed over and coupled to a full conductive layer 204 made of copper (Cu), typically through a thin conductive seed layer 208. Conductive layer 204 is also coupled to either the read head element or the write head element of the magnetic head. An insulator 210 is formed around bottom stud portion 206 over conductive layer 204, such that a top planarized surface is formed with the top of bottom stud portion 206. Top stud portion 202 is formed to make contact with and cover the top of bottom stud portion 206 and has edges which extend over top portions of insulator 210. A lead (not shown) is typically connected to top stud portion 202.

A more simplified cross-sectional view of this interconnection structure is shown in FIG. 2. FIG. 2 shows a conventional trapezoidal stud 304 formed within surrounding materials 302 (e.g. an insulator) with its top generally exposed. A conventional process of making trapezoidal stud 304 involves etching a hole into surrounding materials 302 and forming the stud 304 within the hole. Unfortunately, the etch process is relatively unstable in forming a suitable shape and size for stud 304. As illustrated in FIG. 3, such a trapezoidal stud 304 has a tendency to physically break away from these surrounding materials 302 due to the segregation effect along the borderline. This is highly undesirable, as conductive studs should be securely attached to provide for a reliable electrical coupling within the magnetic recording device.

Accordingly, what are needed are improved interconnection structures and conductive studs for magnetic recording devices and methods of making the same.

SUMMARY OF THE INVENTION

According to the present invention, a magnetic recording device utilizes an "anchored" conductive stud which is securely attached within its surrounding materials. The conductive stud is formed over a conductive layer which is coupled to or part of a read or a write head element of the magnetic recording device. The conductive stud has a top stud portion and a bottom undercut portion which is formed over the conductive layer. Preferably, the bottom undercut portion has a width that is greater than the width of the top stud portion. Since an insulator is formed around the conductive stud and over its bottom undercut portion, a secure coupling between the conductive stud and the conductive layer is provided. Preferably, the conductive layer is made of copper (Cu), the conductive stud is made of gold (Au), and the insulator is alumina ($Al_2O_3$). A seed layer may be formed between the conductive stud and the conductive layer.

A method of making such a conductive stud utilizes a photolithography process. More particularly, the method includes forming a conductive layer which is coupled to or part of a read or a write head element of the magnetic recording device. A seed layer is deposited over the conductive layer, followed by the formation of a resist layer. Next, a photolithography process is used to form a resist structure that includes a recess formed with a bottom undercut. A conductive stud material is plated within this recess and the resist structure is removed to thereby expose the conductive stud. Next, exposed end portions of the seed layer are etched away to form a central seed layer between the conductive layer and the conductive stud. An insulator is then deposited over the conductive layer and around the conductive stud. A planarization process, such as a chemical mechanical polishing (CMP), is performed to form a substantially planar top surface with tops of the insulator and the conductive stud. Advantageously, the conductive stud is formed with a top stud portion and a bottom undercut portion which has a width that is greater than the width of the top stud portion, such that surrounding insulator materials over the bottom undercut portion provide for a secure attachment.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

Figure 1:
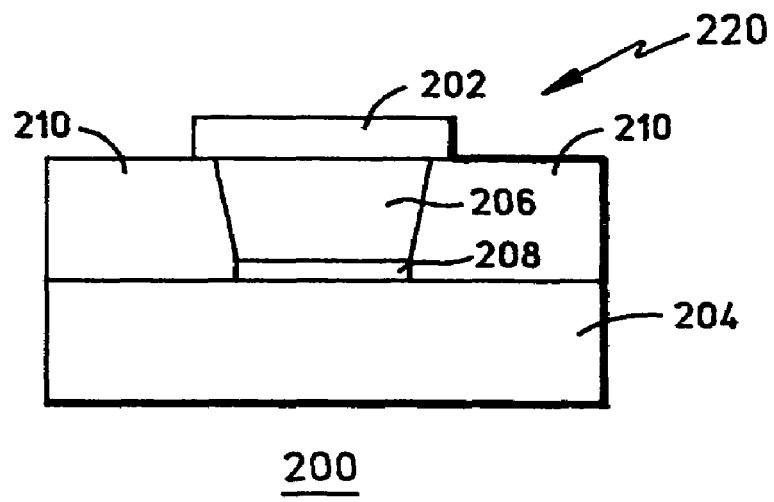
FIG. 1 is a cross-sectional view which shows a conductive stud of the prior art.
Figure 2:
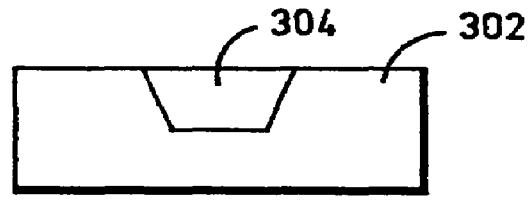
FIG. 2 is a cross-sectional view which shows the conductive stud of the prior art in simplified form.
Figure 3:
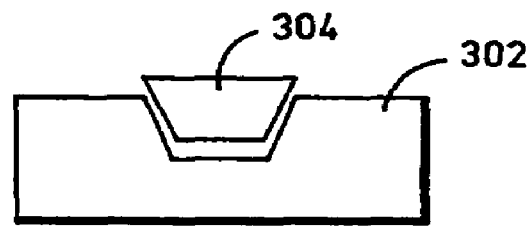
FIG. 3 is a cross-sectional view which shows one particular problem of the conductive stud of the prior art.
Figure 4:
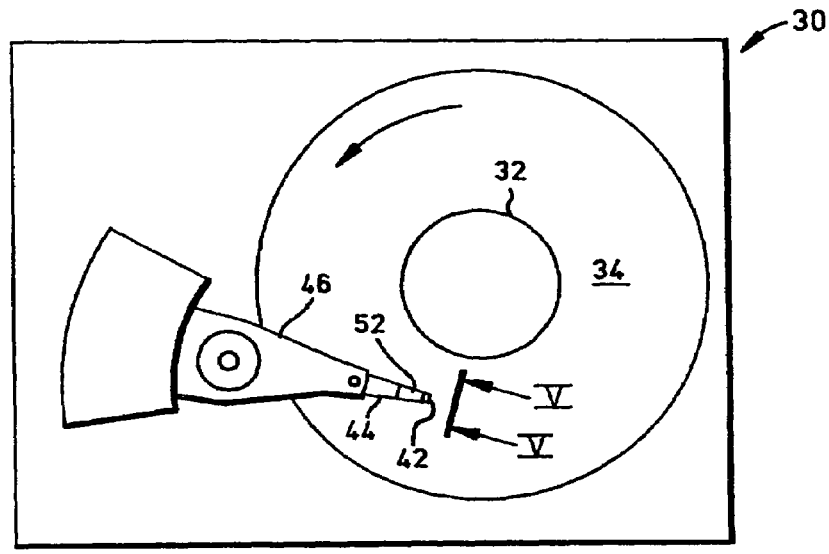
FIG. 4 is a planar view of a conventional magnetic disk drive.
Figure 5:
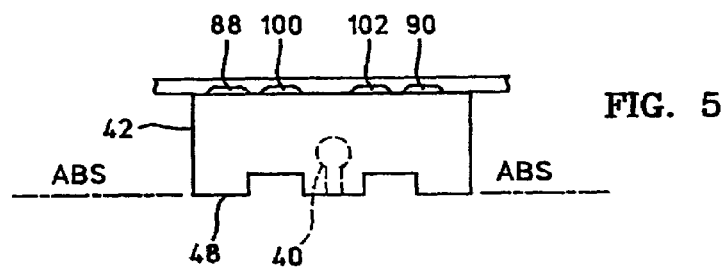
FIG. 5 is an end view of a slider with a magnetic head of the disk drive as seen in plane V—V of FIG. 4.
Figure 6:
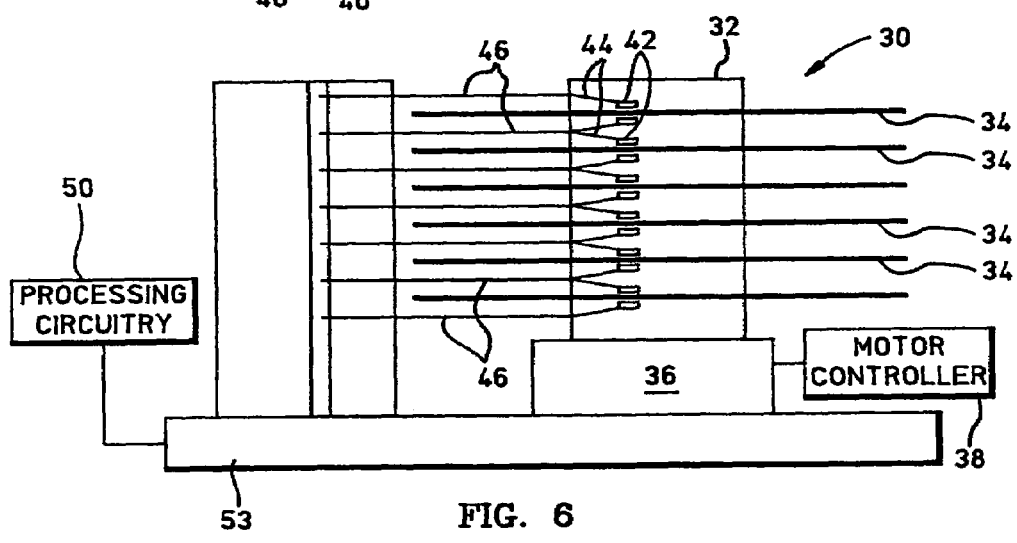
FIG. 6 is an elevation view of the magnetic disk drive wherein multiple disks and magnetic heads are employed.

Referring now to the drawings, wherein like reference numerals designate like or similar parts throughout the several views, there is illustrated in FIGS. 4–6 a conventional magnetic disk drive 30. The drive 30 includes a spindle 32 that supports and rotates a magnetic disk 34. The spindle 32 is rotated by a motor 36 that, in turn, is controlled by a motor controller 38. A horizontal combined magnetic head 40 for reading and recording is built into a slider 42. The slider 42 is supported by a suspension 44 and actuator arm 46. A plurality of disks, sliders and suspensions may be employed in a large capacity direct access storage device (DASD), as shown in FIG. 6. The suspension 44 and actuator arm 46 position the slider 42 to locate the magnetic head 40 in a transducing relationship with a surface of the magnetic disk 34. When the disk 34 is rotated by the motor 36, the slider is supported on a thin (typically, 0.015 µm) cushion of air (air bearing) between the disk and an air bearing surface (ABS) 48.

Figure 7:
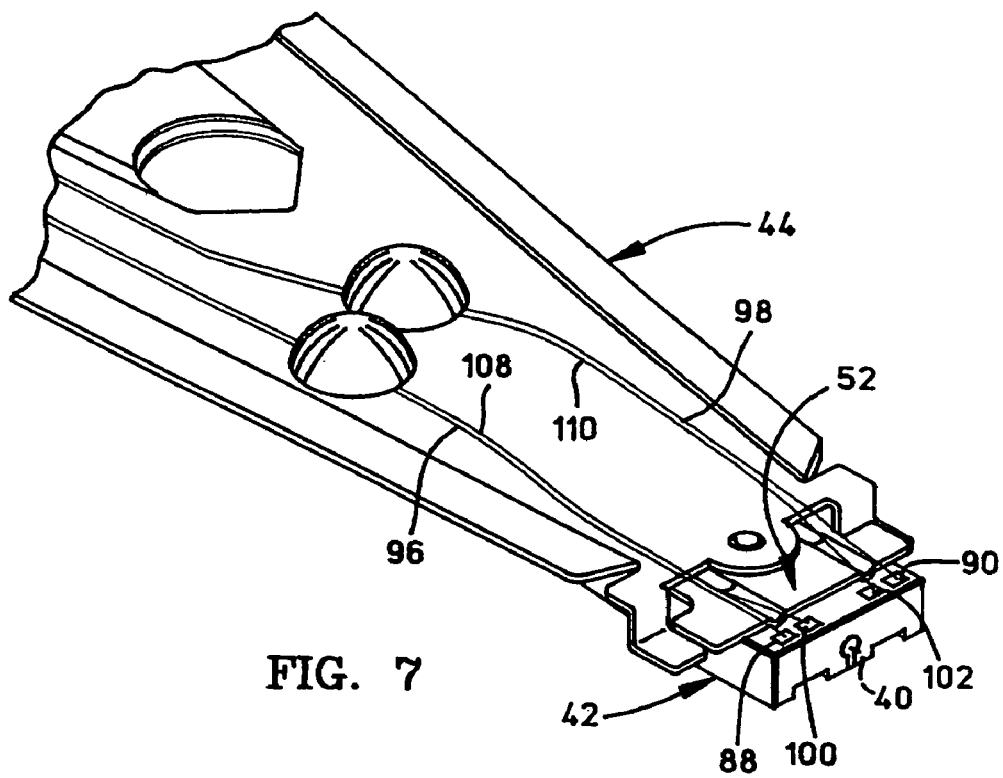
FIG. 7 is an isometric illustration of an exemplary suspension system for supporting the slider and magnetic head.
Figure 8:
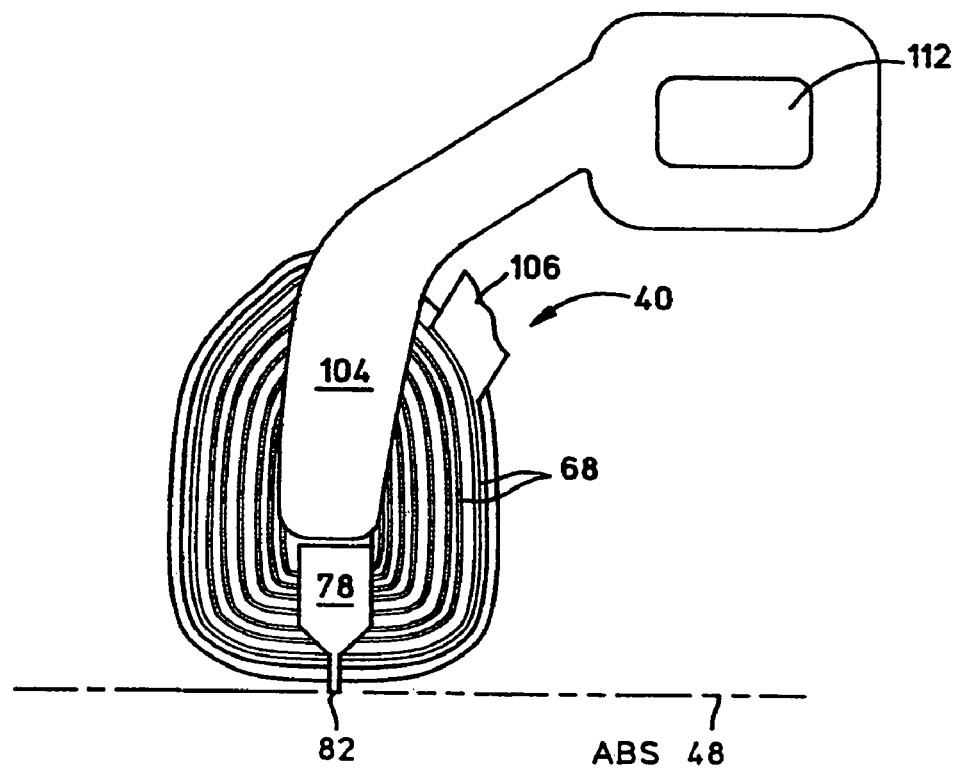
FIG. 8 is a top view of the second pole piece, a coil layer with all insulation material removed, and an electrically conductive stud of the present invention.

The magnetic head 40 may be employed for writing information to multiple circular tracks on the surface of the disk 34, as well as for reading information therefrom. Processing circuitry 50 exchanges signals representing such information with the head 40, provides motor drive signals, and also provides control signals for moving the slider 42 to various tracks. In FIGS. 4 and 7 the slider 42 is shown mounted to a head gimbal assembly (HGA) 52 that is mounted to the suspension 44. All of the above components are supported on a base 53. As shown in FIGS. 5 and 7, conductive pads 88, 90, 100, and 102 connect leads from a read sensor (not shown) and leads 104 and 106 from a write coil 68 (see FIG. 8) to leads 96, 98, 108, and 110 on the suspension 44. Write coils 68 are coupled to a conductive stud 112, which is part of an interconnection structure used in disk drive 30.

FIGS. 9–17 are cross-sectional views of partially formed interconnection structures which help describe a method of forming a conductive stud of the present invention. The method of FIGS. 9–17 may be utilized while making the interconnection structure in the disk drive described above in relation to FIGS. 4–8. The interconnection structure will have the final stud structure shown and described in relation to FIGS. 17–18.

As described previously, a conventional process of making a conductive stud involves etching a hole into surrounding materials and forming the stud within the hole. Unfortunately, the conventional etch process is relatively unstable in forming a suitable shape and size for the conductive stud. According to the present invention, a more suitable shape and size for the stud is formed using a photolithography process.

Figure 9:
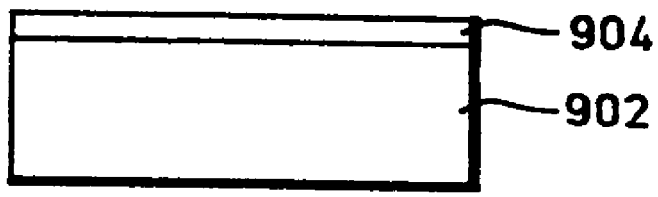
FIG. 9 is the first in a series of ten cross-sectional illustrations in FIGS. 9–18 which describe a method of forming an interconnection structure which includes an electrically conductive stud for a magnetic recording device, showing more particularly a seed layer formed over a conductive layer.

Beginning with FIG. 9, a full conductive layer 902 is formed over a substrate by sputter deposition. Conductive layer 902 may be coupled to or part of an element of the read head (e.g. a read sensor) or an element of the write head (e.g. a write coil), for example. In the present embodiment, conductive layer 902 is actually one of the layers of the write coil of the magnetic recording device. Preferably, conductive layer 902 is made of copper (Cu), but it could be made with any suitable conductive material such as nickel-iron (Ni—Fe). Conductive layer 902 may vary in thickness between, for example, about 1–3 micrometers (μm), and in the present embodiment has a thickness of about 2 μm. Next, a seed layer 904 is sputter deposited on top of this conductive layer 902. Seed layer 904 may vary in thickness between, for example, about 50–100 nm, and in the present embodiment has a thickness of about 80 nm. In the present embodiment, seed layer 904 is a dual layer of nickel-iron (NiFe) and gold (Au) which have thicknesses of 20 nm and 60 nm, respectively.

Figure 10:
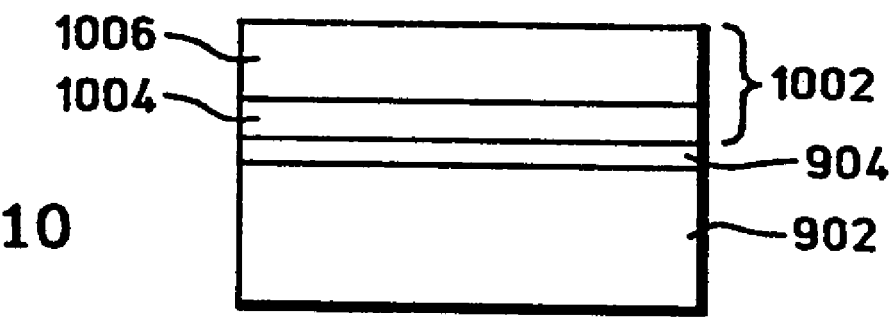
FIG. 10 is the second in a series of ten illustrations of FIGS. 9–18 which describe a method of forming the electrically conductive stud, showing more particularly the structure of FIG. 9 except that a dual resist layer is formed over the conductive layer.

In FIG. 10 it is shown that a resist 1002 is formed over seed layer 904. Resist 1002 may vary in thickness between, for example, about 15–30 micrometers (μm), and in the present embodiment has a thickness of about 20 micrometers (μm). In this embodiment, resist 1002 is a dual layer resist which includes a top resist layer 1004 and a bottom resist layer 1006. Preferably, top resist layer 1004 is a photosensitive resist (e.g. well-known HC-935) and bottom resist layer 1006 is a non-photosensitive resist (e.g. well-known PMGI). This dual resist layer helps later facilitate the formation of a bottom undercut structure with a recess within resist 1002. In the present embodiment, top resist layer 1004 and bottom resist layer 1006 have thicknesses of 15 μm and 5 μm, respectively.

Figure 11:
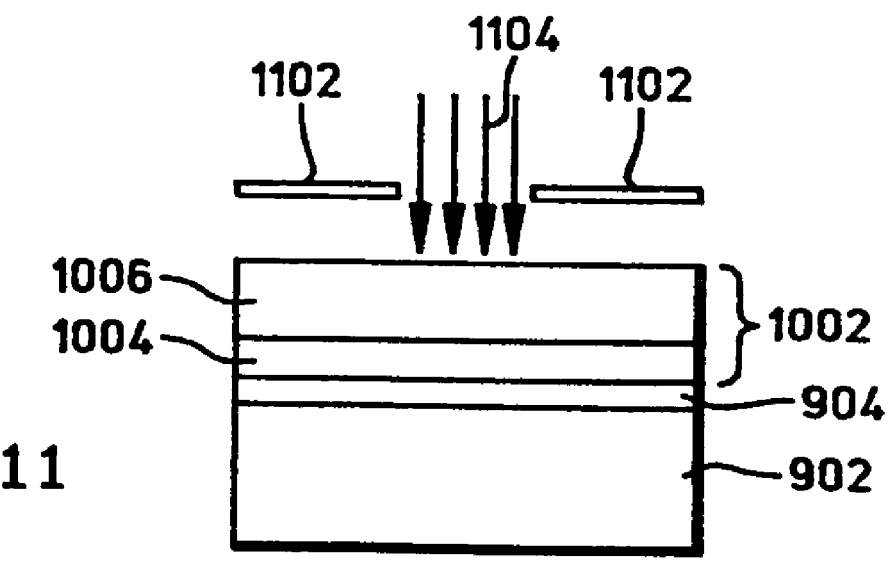
FIG. 11 is the third in a series of ten illustrations of FIGS. 9–18 which describe a method of forming the electrically conductive stud, showing more particularly the structure of FIG. 10 being subjected to a photolithography process.
Figure 12:
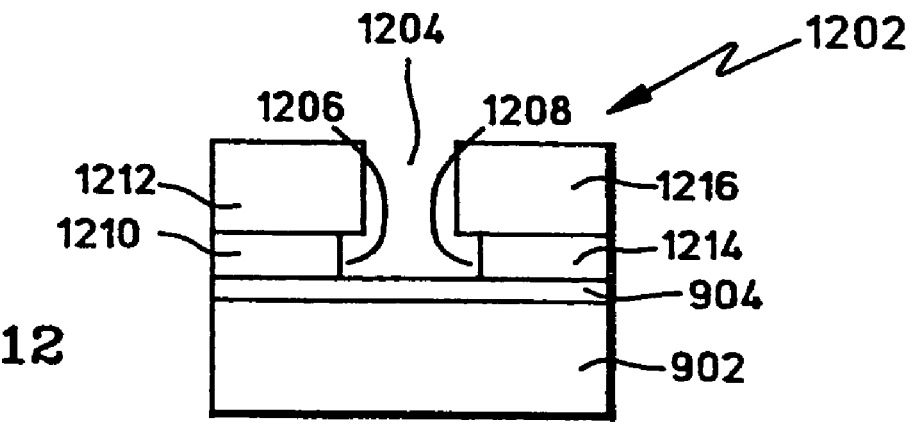
FIG. 12 is the fourth in a series of ten illustrations of FIGS. 9–18 which describe a method of forming the electrically conductive stud, showing more particularly the structure of FIG. 10 except that a recess with undercuts is formed within the resist layer.

In FIG. 11, it is shown that resist 1002 is exposed to light 1104 in a selected central area of resist 1002 with use of a mask 1102. The central hole of mask 1102 may be any suitable width, and in the present embodiment has a width of about 110 μm. In FIG. 12, it is shown that a recess 1204 is then formed within the resist using a wet etching process, which leaves behind surrounding resist structures 1210, 1212, 1214, and 1216. As illustrated, recess 1204 is formed with bottom undercuts 1206 and 1208. In this process, a suitable solvent or acid is applied so that materials of the top resist layer are dissolved and the materials of the bottom resist layer are etched over a suitable time period to achieve the desired undercut width. Preferably, the width of the undercut is greater than 110% of the top stud portion and, for a recess width of 110 μm, the undercut width may be between about 120–130 μm.

Figure 13:
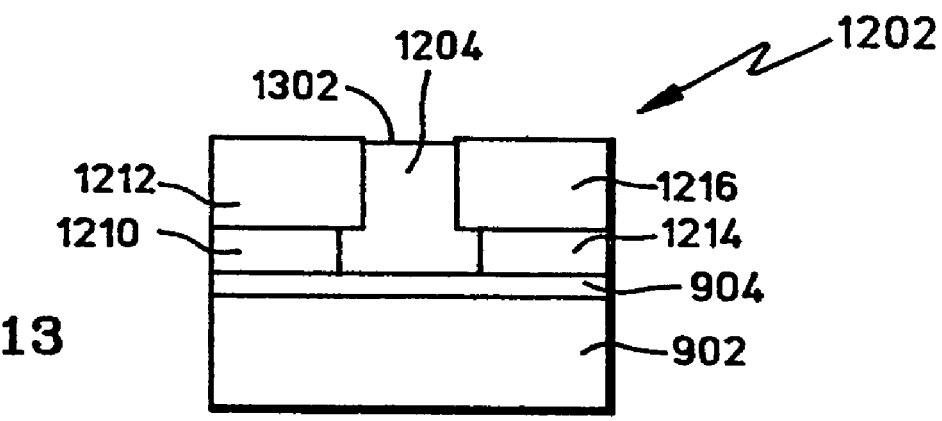
FIG. 13 is the fifth in a series of ten illustrations of FIGS. 9–18 which describe a method of forming the electrically conductive stud, showing more particularly the structure of FIG. 12 except that a conductive stud material is formed within the recess.

In FIG. 13, a conductive stud material 1204 is then electroplated within recess 1204. Preferably, conductive stud material 1204 is made of gold (Au), but it could be any other suitable conductive material such as copper (Cu). Also preferably, conductive stud material 1204 is electroplated by a conventional process known as non-cyanide gold plating. This process is typically followed by a clean step which utilizes an ash process to remove any remaining resist on the surface. Surrounding resist structures 1210, 1212, 1214, and 1216 of FIG. 13 are then removed by dissolving the resist with a suitable solvent. This reveals the conductive stud 1302 shown in FIG. 14.

Figure 14:
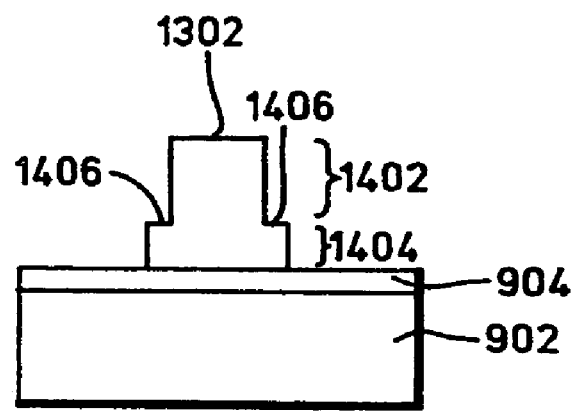
FIG. 14 is the sixth in a series of ten illustrations of FIGS. 9–18 which describe a method of forming the electrically conductive stud, showing more particularly the structure of FIG. 13 except that the resist structure is removed.

As shown in FIG. 14, conductive stud 1302 is formed with a top stud portion 1402 and a bottom undercut portion 1404 which is formed over conductive layer 902 (on seed layer 904). Formed in the same processing step, top stud portion 1402 and bottom undercut portion 1404 are integrally formed together as a single unit. In this embodiment, bottom undercut portion 1404 has an undercut 1406 which provides a width that is greater than the width of top stud portion 1402. This extended width is formed all around the bottom "perimeter" of conductive stud 1302. Thus, at least a portion of bottom undercut portion 1404 is formed to extend laterally relative to top stud portion 1402 so that subsequently deposited insulator materials may be formed over it.

Figure 15:
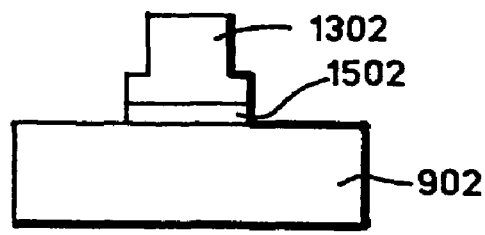
FIG. 15 is the seventh in a series of ten illustrations of FIGS. 9–18 which describe a method of forming the electrically conductive stud, showing more particularly the structure of FIG. 14 except that end portions of the seed layer are removed by etching.
Figure 16:
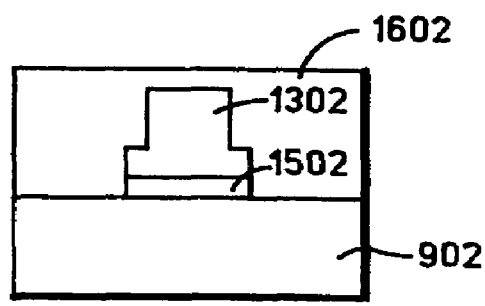
FIG. 16 is the eighth in a series of ten illustrations of FIGS. 9–18 which describe a method of forming the electrically conductive stud, showing more particularly the structure of FIG. 15 except that an insulator material is deposited over it.
Figure 17:
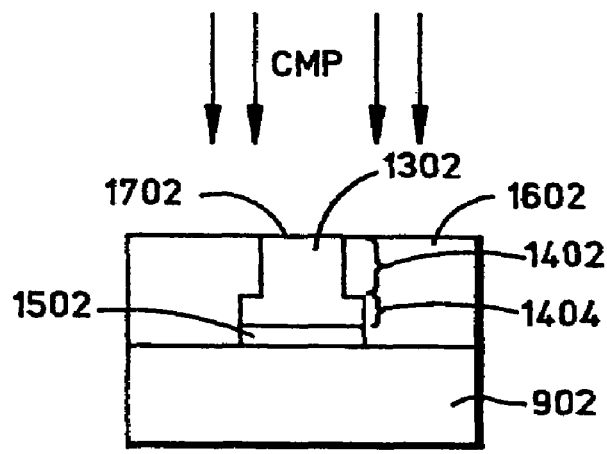
FIG. 17 is the ninth in a series of ten illustrations of FIGS. 9–18 which describe a method of forming the electrically conductive stud, showing more particularly the structure of FIG. 16 except that its top surface has been planarized by chemical mechanical polishing (CMP), to thereby form the interconnection structure of the present invention.

Next, a wet etch is used to remove exposed end portions of seed layer 904 to form a central seed layer 1502 as shown in FIG. 15. The wet etch may use any suitable etch solution or acid. In FIG. 15, insulator materials 1602 are then deposited over and around conductive stud 1302 and conductive layer 902. These insulator materials 1602 are also formed over bottom undercut portion 1404. Insulator materials 1602 may be any suitable electrically-insulating material, such as alumina ($Al_2O_3$). In FIG. 16, it is shown that a planarization process such as a chemical mechanical polishing (CMP) is performed to form a substantially planarized top surface 1702 with the tops of insulator materials 1602 and conductive stud 1302.

Figure 18:
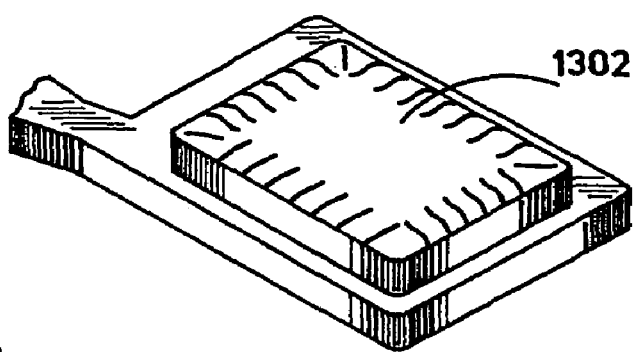
FIG. 18 is the tenth and final illustration in FIGS. 9–18 which describe a method of forming the electrically conductive stud, showing more particularly perspective view of the stud formed by the method.

The conductive stud 1302 is thereby formed, and FIG. 18 shows a perspective view of a top of a completed conductive stud 1302. The thickness of conductive stud 1302 may vary between about 15–30 μm, and in the present embodiment is about 20 μm. The general width of conductive stud 1302 may vary greatly, but bottom undercut portion 1404 is formed to extend laterally relative to top stud portion 1402 such that insulator materials 1602 are formed over it for secure attachment. In this embodiment, bottom undercut portion 1404 is formed all around conductive stud 1302 with a width that is greater than top stud portion 1402. More specifically, top stud portion 1402 has a width of about 110 μm and bottom undercut portion 1404 has a width of between about 120–130 μm. A lead is subsequently wire-bonded to conductive stud 1302, preferably using an ultrasonic wire bonding process.

As described herein, a magnetic recording device makes use of an "anchored" conductive stud which is securely attached within its surrounding materials. The conductive stud is formed over a conductive layer which is coupled to or part of a read or a write head element of a magnetic head. In one illustrated example, the conductive layer is one of the write coil layers of a magnetic write head. The conductive stud has a top stud portion and a bottom undercut portion formed over the conductive layer. Preferably, the bottom undercut portion has a width that is greater than the width of the top stud portion. Since an insulator is formed around the conductive stud (and over the bottom undercut portion), a secure coupling between the conductive stud and the conductive layer is provided. Preferably, the conductive layer is made of copper (Cu), the conductive stud is made of gold (Au), and the insulator is alumina ($Al_2O_3$). A seed layer may be formed between the conductive stud and the conductive layer. Such a conductive stud may be made with use of a photolithography process as previously described.

It is to be understood that the above is merely a description of preferred embodiments of the invention and that various changes, alterations, and variations may be made without departing from the true spirit and scope of the invention as set for in the appended claims. For example, the conductive studs described herein may be utilized in any other suitable device, such as a semiconductor device. None of the terms or phrases in the specification and claims has been given any special particular meaning different from the plain language meaning to those skilled in the art, and therefore the specification is not to be used to define terms in an unduly narrow sense.

What is claimed is:

1. An interconnection structure for a magnetic head which has at least one of a read head element and a write head element, the interconnection structure comprising:
   a conductive layer which is coupled to or part of the read or the write head element;
   a conductive stud coupled to the conductive layer;
   an insulator formed around the conductive stud;
   the conductive stud having:
      a top portion having a top surface that is exposed for lead connection;
      a bottom undercut portion formed over the conductive layer;
      the top and the bottom undercut portions being integrally formed together as a single unit of the same material; and
      the bottom undercut portion being formed to extend laterally relative to the top portion such that the insulator is formed over the bottom undercut portion.

2. The interconnection structure of claim 1, wherein the bottom undercut portion is formed to secure the coupling between the conductive stud and the conductive layer.

3. The interconnection structure of claim 1, wherein the top and the bottom undercut portions are integrally formed together as a single unit of the same material comprising gold (Au).

4. The interconnection structure of claim 1, wherein the width of the bottom undercut portion is greater than the width of the top portion such that the insulator is formed over it.

5. The interconnection structure of claim 1, further comprising:
   a seed layer formed between the bottom undercut portion and the conductive layer.

6. The interconnection structure of claim 1, wherein the read or the write head element comprises a write coil and the conductive layer comprises a write coil layer of the write coil.

7. The interconnection structure of claim 1, wherein the top and the bottom undercut portions are integrally formed together as a single unit of the same material comprising copper (Cu).

8. The interconnection structure of claim 1, wherein the width of the bottom undercut portion is formed all around a bottom perimeter of the conductive stud and is greater than the width of the top portion, such that the insulator is formed over the bottom undercut portion and the conductive stud is anchored within the insulator.

9. The interconnection structure of claim 1, wherein the width of the bottom undercut portion is formed all around a bottom perimeter of the conductive stud and is greater than 110% of the width of the top stud portion, such that the insulator is formed over the bottom undercut portion and the conductive stud is anchored within the insulator.

10. A magnetic recording device, comprising:
    at least one magnetic disk;
    a spindle which supports the at least one magnetic disk;
    a disk drive motor which rotates the at least one magnetic disk;
    a magnetic head which has at least one of a read head element and a write head element;
    a slider which supports the magnetic head;
    a conductive layer which is coupled to or part of the read or the write head element;
    a conductive stud coupled to the conductive layer;
    an insulator formed around the conductive stud;
    the conductive stud having:
       a top portion having a top surface that is exposed for lead connection;
       a bottom undercut portion formed over the conductive layer;
       the top and the bottom undercut portions being integrally formed together as a single unit of the same material; and
       the bottom undercut portion being formed to extend laterally relative to the top portion such that the insulator is formed over the bottom undercut portion.

11. The magnetic recording device of claim 10, wherein the bottom undercut portion is formed to secure the coupling between the conductive stud and the conductive layer.

12. The magnetic recording device of claim 10, wherein the top and the bottom undercut portions are integrally formed together as a single unit of the same material comprising gold (Au).

13. The magnetic recording device of claim 10, wherein the width of the bottom undercut portion is greater than the width of the top portion such that the insulator is formed over it.

14. The magnetic recording device of claim 10, further comprising:
    a seed layer formed between the bottom undercut portion and the conductive layer.

15. The magnetic recording device of claim 10, wherein the magnetic head comprises a write coil and the conductive layer comprises a write coil layer of the write coil.

* * * * *